(12) United States Patent
Luo et al.

(10) Patent No.: US 7,011,455 B2
(45) Date of Patent: Mar. 14, 2006

(54) OPTO-ELECTRONIC TO-PACKAGE AND METHOD FOR LASER

(75) Inventors: Xin Simon Luo, Baldwin Park, CA (US); Bryon Lynn Kasper, San Marino, CA (US); Eva Peral, Pasadena, CA (US); Matthew Swass, Tujunga, CA (US)

(73) Assignee: Emcore Corporation, Somerset, NJ (US)

( * ) Notice: Subject to any disclaimer, the term of this patent is extended or adjusted under 35 U.S.C. 154(b) by 204 days.

(21) Appl. No.: 10/465,276

(22) Filed: Jun. 19, 2003

(65) Prior Publication Data

US 2004/0258368 A1    Dec. 23, 2004

(51) Int. Cl.
    *G02B 6/42* (2006.01)
(52) U.S. Cl. .......................... 385/88; 385/93
(58) Field of Classification Search ............ 385/31–33, 385/35, 88, 93
    See application file for complete search history.

(56) References Cited

U.S. PATENT DOCUMENTS

| | | | |
|---|---|---|---|
| 5,457,557 A * | 10/1995 | Zarem et al. ............... 398/116 |
| 5,963,694 A * | 10/1999 | Fujimura et al. ............. 385/88 |
| 6,353,491 B1 * | 3/2002 | Tanaka et al. .............. 398/139 |
| 6,693,312 B1 * | 2/2004 | Dietrich et al. ............. 257/200 |
| 6,731,882 B1 * | 5/2004 | Althaus et al. ............. 398/139 |
| 2001/0026574 A1 * | 10/2001 | Yagi ........................... 372/102 |
| 2002/0141142 A1 | 10/2002 | Rookes |
| 2003/0020998 A1 | 1/2003 | Kuczynski |
| 2003/0047674 A1 | 3/2003 | Thornburn et al. |
| 2003/0147601 A1 * | 8/2003 | Bartur et al. .................. 385/92 |
| 2003/0223727 A1 | 12/2003 | Soskind et al. |
| 2004/0017977 A1 * | 1/2004 | Lam et al. ..................... 385/49 |
| 2004/0151442 A1 * | 8/2004 | Scruggs et al. ............... 385/92 |

* cited by examiner

*Primary Examiner*—Frank G. Font
*Assistant Examiner*—Christopher M. Kalivoda
(74) *Attorney, Agent, or Firm*—Christie, Parker & Hale, LLP

(57) ABSTRACT

An optical interface between an optical fiber and a laser is provided. The optical fiber has a core and an end. The optical interface includes a mirror that is capable of receiving an optical output of the laser and of reflecting the optical output to the end of the optical fiber such that a chief ray of the optical output is incident on the core of the optical fiber. The optical interface also includes a lens located such that the chief ray of the optical output traverses a center of the lens. Such optical interface may be used in a transmitter optical subassembly (TOSA) having a vertical TO package for un-cooled lasers.

20 Claims, 5 Drawing Sheets

OPTO-ELECTRONIC TO-PACKAGE AND METHOD FOR LASER

CROSS-REFERENCE TO RELATED APPLICATIONS

This application contains subject matter related to the subject matter disclosed in a commonly owned U.S. patent application entitled, "A TO-packaged Optic-Fiber Receiving Interface and Method", application Ser. No. 10/465,300 filed on the same day.

BACKGROUND

A typical transmitter optical subassembly (TOSA) includes an opto-electronic TO package that contains a laser and a lens, and a receptacle that contains a fiber stub. The TO package and the receptacle are coupled together such that the output of the laser is focused through the lens on the core of the fiber stub.

In TO packages for un-cooled lasers, a package configuration called vertical TO package is frequently used. In a vertical TO package, a laser chip on a substrate, e.g., an edge emitting laser diode, is mounted substantially flat on a TO header rather than being mounted at substantially 90 degree angle with respect to the TO header on a flange. This results in a reduction to the length of thermal path between the laser chip and a contact surface (for heat sink) in the TO package. Therefore, a laser chip under the same condition can typically operate at a temperature of 5 to 7 degrees less than the case where the laser chip is mounted on a flange.

Since the laser output from the TO package should point vertically away from the TO header, in vertical TO packages, the laser propagating direction is folded from the horizontal (i.e., generally parallel to the TO header) to vertical (i.e., generally perpendicular to the TO header) using a reflective mirror. In typical vertical TO packages, the mirror cut angle is selected to be 45 degrees.

The fiber stub is typically cleaved at the receiving end so that a crossing angle exists between the central line of the fiber stub and that of the laser output. This way, the interference between the reflected laser output and the laser output may be reduced, thereby resulting in reduction to optical return loss. In order to ensure that the laser output is incident on the cleaved edge of the fiber stub at a proper angle, the center of the focus lens is typically moved off the centerline of the optical system. However, when the center of the focus lens is moved off the centerline of the optical system, a chief ray of the laser output does not overlap an optical axis of the lens. In such systems, a large amount of off-axis aberration (coma, astigmatism, etc.) may result, and thereby may reduce optical coupling efficiency.

SUMMARY

In an exemplary embodiment in accordance with aspects of the present invention, an optical interface between an optical fiber and a laser, said optical fiber having a core and an end, is provided. The optical interface comprises: a mirror capable of receiving an optical output of the laser and of reflecting the optical output to the end of the optical fiber such that a chief ray of the optical output is incident on the core of the optical fiber; and a lens located such that the chief ray of the optical output traverses a center of the lens.

In another exemplary embodiment in accordance with aspects of the present invention, an optical assembly is provided. The optical assembly comprises: an optical fiber having a core and an end; a laser; a mirror capable of receiving an optical output of the laser and of reflecting the optical output to the end of the optical fiber such that a chief ray of the optical output is incident on the core of the optical fiber; and a lens disposed between the mirror and the optical fiber, the lens being located such that the chief ray of the optical output traverses a center of the lens.

In yet another exemplary embodiment in accordance with aspects of the present invention, a method of providing an optical output from a laser to an end of an optical fiber having a core is provided. The method comprises: placing a mirror in an optical path between the laser and said end of the optical fiber such that a chief ray of the optical output of the laser is incident on the core of the optical fiber at an angle; and placing a lens between the mirror and said end of the optical fiber such that the chief ray of the optical output is substantially aligned with an optical axis of the lens.

In still another exemplary embodiment in accordance with aspects of the present invention, in an optical assembly comprising an optical fiber and an opto-electronic device, a method of improving coupling efficiency between the optical fiber and the opto-electronic device is provided. The method comprises: slanting an edge of the optical fiber that optically interfaces with the opto-electronic device; and placing a lens between the optical fiber and the opto-electronic device such that a chief ray of an optical signal between the optical fiber and the opto-electronic device is substantially aligned with an optical axis of the lens, thereby reducing off-axis aberration.

These and other aspects of the invention will be more readily comprehended in view of the discussion herein and accompanying drawings.

DETAILED DESCRIPTION

In an exemplary embodiment in accordance with aspects of the present invention, a TO package for laser is designed to reduce off-axis aberration and increase optical coupling efficiency. Such TO package may for example be applicable to un-cooled lasers.

Figure 1:
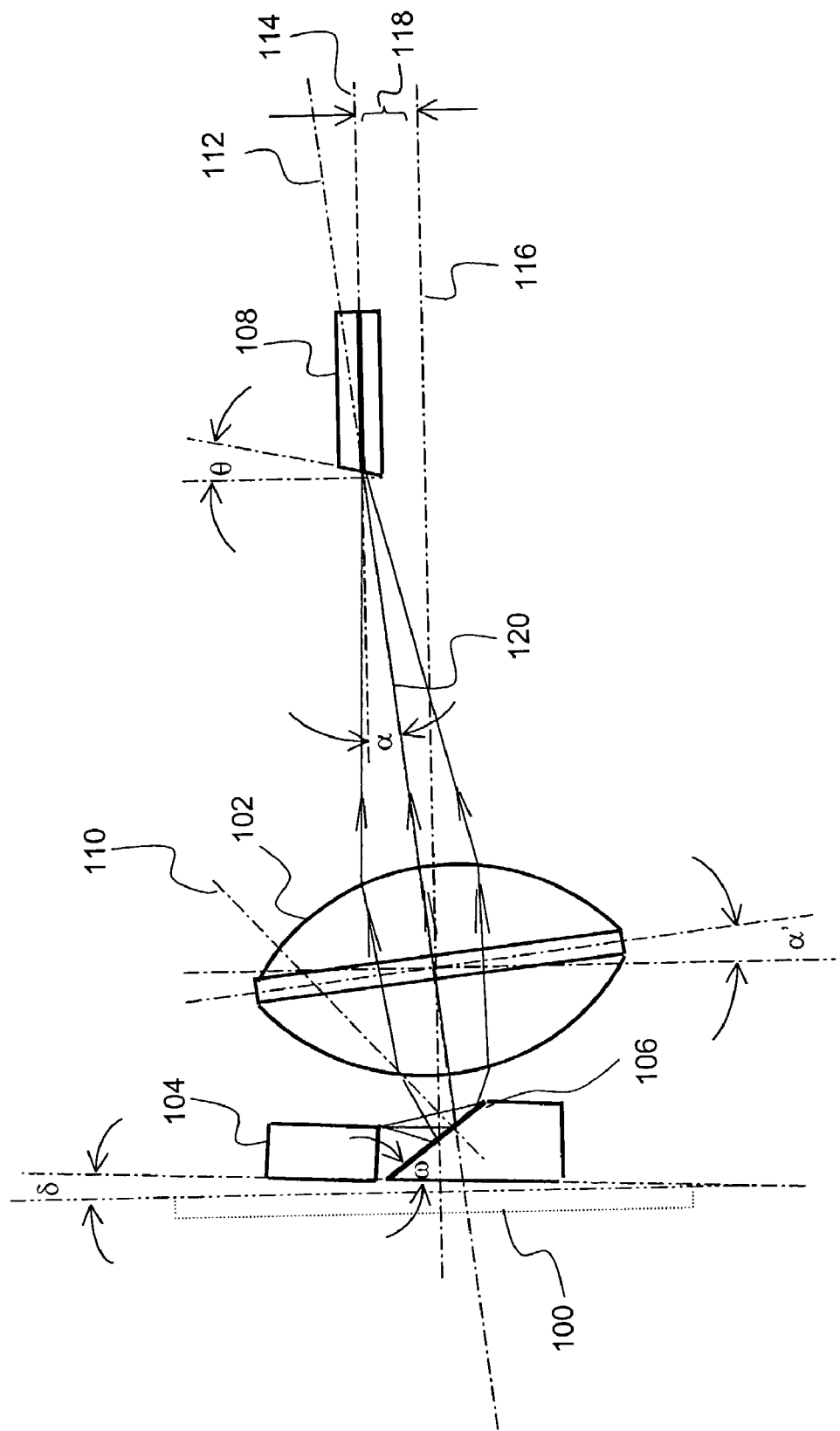
FIG. 1 illustrates a schematic view of an opto-electronic TO package for a laser in an exemplary embodiment in accordance with aspects of the present invention.

FIG. 1 illustrates a schematic view of an opto-electronic TO package for a laser (i.e., a laser diode on a substrate) 104 in an exemplary embodiment in accordance with aspects of the present invention. In FIG. 1, the base of the TO package is represented by an outline 100. The outline 100, for example, may represent a TO header (or a portion thereof) on which the laser 104 is mounted. A laser output is applied at an edge of an optical fiber 108 through a lens 102, which is a suitable positive (converging) lens, and may be a ball ("micro ball") lens. A receptacle containing the TO package (containing the laser and the lens) and the fiber stub may be referred to as a transmitter optical subassembly (TOSA).

The laser 104 may, for example, be an edge emitting laser chip that operates at high speeds such as 10 Giga bits per second (Gbps) or higher. Further, the laser 104 may have a wavelength of 1310 nm (nanometer) or 1550 nm, and may be a DFB (distributed feedback) laser or an FP (Fabrey-Perot) laser. The laser 104 includes a substrate base on which a laser diode is mounted (or fabricated).

A mirror 106 may be mounted on the same or different semiconductor substrate base as the laser 104. For example, the mirror may be mounted on the same semiconductor substrate accurately using a micro-projector with a tolerance of approximately 0.5 $\mu$m. The mirror 106 may be fabricated from silicon, and may be used to change the direction of the laser output from a direction generally parallel to the TO header to another direction generally perpendicular to the TO header. In other embodiments, any other suitable mirror may be used instead of a silicon mirror. FIG. 1 also illustrates a line 110 that is normal to the surface of the mirror 106.

The mirror 106 receives the laser output and reflects it toward an optical fiber 108. The optical fiber 108 may be an end portion of a fiber optic cable or it may be a fiber stub enclosed at least partially in a receptacle. The fiber optical cable or the fiber stub for example may be SMF-28 or any other suitable single mode optical fiber.

In order to reduce the optical return loss in a TO packaged laser, the optical fiber 108 is slanted at the receiving end with a fiber cleavage angle $\theta$ with respect to a line that is perpendicular to a line substantially aligned with (or substantially overlapping) the optical fiber core, i.e., the line 114. This way, the optical output reflected by the surface of the optical fiber may be directed away from the mirror and therefore the laser. Such slanted end may be realized through cleaving and/or polishing. Since it is substantially aligned with the optical fiber core, the line 114 may be referred to as a core aligned line 114. In other embodiments, the TOSA (e.g., for a DFB laser) may include an LD (laser diode) isolator between the mirror and the optical fiber so that the reflected light can be further reduced.

The relationship between a chief ray incident angle $\alpha$ and the fiber cleavage angle $\theta$ is represented by the following equation: $\alpha = \arcsin(n\_core/n\_air * \sin\theta) - \theta$, where n_air (index of refraction of air)=1.0 and n_core (index of refraction of optical fiber core)=1.4677 at 1310 mm for SMF-28, for example. By way of example, to achieve a low optical return loss of about −60 dB, the fiber stub cleavage angle $\theta$ may be selected to be 8 degrees. Based on the above equation, the chief ray incident angle (crossing angle) $\alpha$=3.786 degrees when n_core=1.4677 and the fiber cleavage angle $\theta$=8 degrees.

Since the chief ray incident angle $\alpha$ is the angle between the core aligned line 114 and a chief ray 120 outputted by the laser 104, the laser, the mirror, the lens and the optical fiber should have a spatial relationship with one another such that the chief ray forms an angle of $\alpha$=3.786 degrees with respect to the core aligned line 114.

With the laser diode being mounted on a substrate, the chief ray emitted by the laser diode is parallel to the substrate surface. Therefore, from this geometric structure a relationship between $\alpha$ (chief ray incident angle), $\omega$ (mirror cut angle) and $\delta$ (angle at which the laser 104 and the mirror 106 are mounted on the TO header (or alternatively, the angle at which the TO header is tilted with respect to a line perpendicular to the core aligned line 114)) are given by the following equation: $\delta = 2\omega - \alpha - 90°$. For example, the angle $\delta$ on the TO header may be formed through stamping on the surface of the TO header prior to mounting the laser and the mirror.

Based on the above equation, when the mirror 106 has a cut angle of $\omega$=45 degrees, the substrate tilt angle is given by: $\delta = 2(45) - 3.786 - 90 = -3.786$ or the angle identical in magnitude and opposite in direction to the chief ray incident angle $\alpha$. However, the introduction of this additional stamping or tilting of the TO header may result in a more complex manufacturing process.

Therefore, in one exemplary embodiment, the need for introducing the substrate tilt angle $\delta$ is eliminated by adjusting the cut angle $\omega$ of the mirror 106. Using the above equation, when the substrate tilt angle $\delta$ is set to be 0 degrees and the cut angle $\omega$ is made variable, the equation reduces to $2\omega - 3.786 - 90 = 0$. In this case, the cut angle $\omega$=(93.786 degrees/2)=46.893 degrees. Considering manufacturing tolerance of $\pm 1.0°$ for the fiber cleavage angle of $\theta$=8 degrees, the chief ray incident angle $\alpha$ varies between $\alpha$=3.304 degrees to 4.209 degrees, so that the mirror cut angle ranges from 46.652 degrees to 47.1045 degrees.

In the fiber-telecom industry, silicon crystal (wafer) is often used to produce V-grooves using <1,0,0> oriented silicon with an etching angle of 54.74 degrees, and coat them with reflection coating to fabricate micro mirrors. When a silicon mirror with 54.74 etching angle is polished on a polishing fixture with a 7.5 slope angle, the mirror cut angle of approximately 47.2±1.0 degrees can be realized. Such mirror cut angle is roughly within the mirror cut angle range of $\omega$=approximately 46.652 to 47.1045 degrees.

In the exemplary embodiment, the mirror cut angle is selected to be approximately 47.2 degrees to direct the chief ray of the laser output to the edge of the optical fiber 108. The mirror cut angle may be different in other embodiments. In the optical interface, the lens 102 is also tilted by an angle of $\alpha'$ (which has the same magnitude (i.e., 3.786 degrees) as the chief ray incident angle $\alpha$) so that the chief ray 120 of the optical signal reflected by the mirror 106 substantially overlaps the optical axis 112 of the lens 102. The lens 102, for example, may be mounted on a TO lens holder (not shown).

The chief ray in the exemplary embodiment is substantially aligned with the optical axis 112 of the lens 102. A centerline 116 of the lens that traverses (i.e., passes through) the center of the lens and is parallel to the core aligned line 114, is offset from the core aligned line 114 by an offset distance 118. The system of FIG. 1 may generally have a magnification of approximately 1:3.5 to 1:4. The magnification may be same or different in other embodiments. For example, depending on the lens selection and application, the magnification may be approximately 1:6 in an alternate embodiment.

Figure 2:
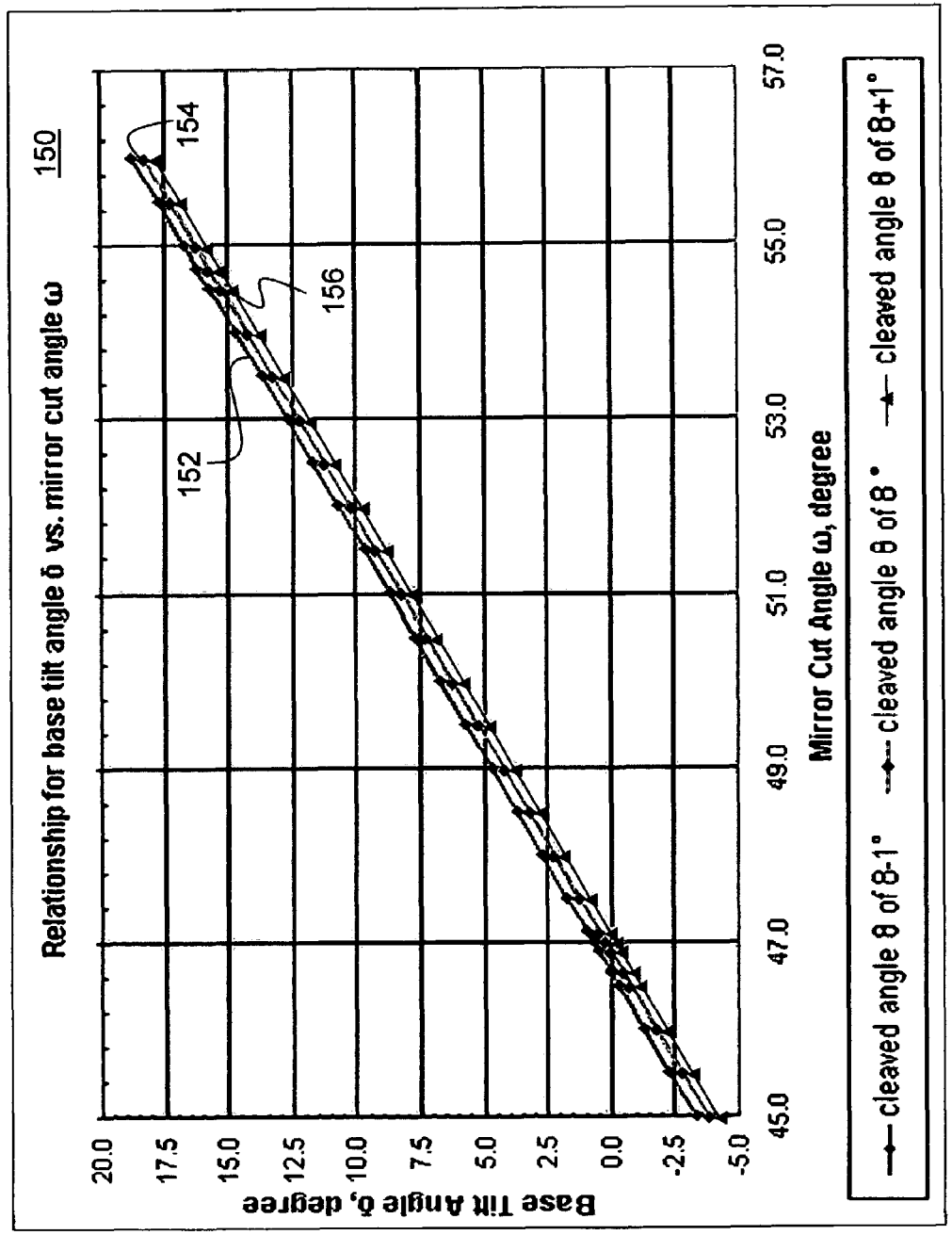
FIG. 2 is a graph that illustrates a relationship between a base tilt angle and a mirror cut angle in an exemplary embodiment in accordance with aspects of the present invention.

FIG. 2 is a graph 150 that illustrates a relationship between a base tilt angle and a mirror cut angle in an exemplary embodiment in accordance with aspects of the present invention. The graph 150 includes plot 152 for the case where the cleavage angle is 7 degrees, plot 154 for the case where the cleavage angle is 8 degrees, and plot 156 for the case where the cleavage angle is 9 degrees. It can be seen in plots 152, 154 and 156 that by selecting the mirror cut angle at each cleavage angle of the optical fiber, the tilt angle (of either the laser/mirror or the TO header) of zero may be realized.

In another exemplary embodiment in accordance with aspects of the present invention, the TOSA optical configuration is selected to use a silicon substrate mirror with an approximately 54.74 degree cut angle. In this case, the substrate tilt angle δ may be selected to be approximately 15.69 degrees to optimize the angle at which the chief ray is incident on the slanted edge of the optical fiber 208.

In yet another exemplary embodiment in accordance with aspects of the present invention, the angle θ may range from −5 to −12 degrees, and may be approximately −8 degrees. When the cleavage angle θ is −8 degrees, the chief ray incident angle α is negative and has an absolute value of |−3.786| degrees. In this case, the mirror cut angle w should be approximately 43.107 degrees if the tilt angle δ is set to 0 degrees. Therefore, when the cleavage angle θ for the optical fiber is −8 degrees, the mirror cut angle ω may be selected to be approximately 43 degrees to avoid tilting either the TO header or the laser with respect to the TO header.

Figure 3:
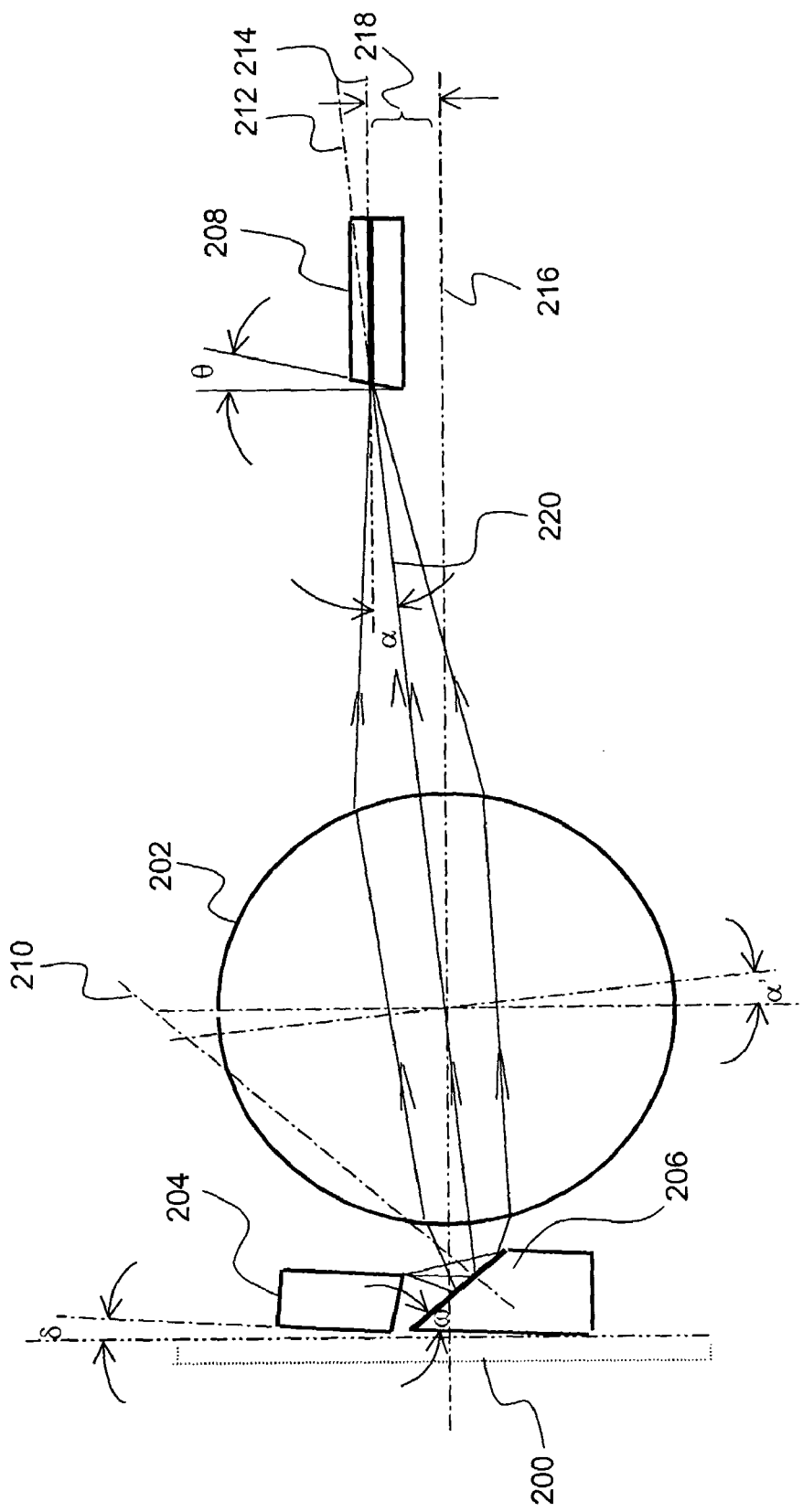
FIG. 3 illustrates a schematic view of an opto-electronic TO package having a ball lens for a laser in another exemplary embodiment in accordance with aspects of the present invention.

FIG. 3 illustrates a schematic view of an opto-electronic TO package having a ball lens for a laser in another exemplary embodiment in accordance with aspects of the present invention. The TO package of FIG. 3 is similar to the TO package of FIG. 1 except that the TO package of FIG. 3 is illustrated as specifically containing a ball lens.

In FIG. 3, the base of the TO package is represented by an outline 200. The outline 200, for example, may represent a TO header (or a portion thereof) on which the laser 204 is mounted. A laser output is applied at an edge of an optical fiber 208 through a ball lens 202. A receptacle containing the TO package (containing the laser and the lens) and the fiber stub may be referred to as a transmitter optical subassembly (TOSA).

The laser 204 may, for example, be an edge emitting laser chip that operates at high speeds such as 10 Gbps or higher. Further, the laser 204 may have a wavelength of 1310 nm or 1550 nm, and may be a DFB laser or an FP laser. The laser 204 includes a substrate base on which a laser diode is mounted (or fabricated).

A mirror 206 may be mounted on the same or different semiconductor substrate base as the laser 204. The mirror 206 may be fabricated from silicon, and may be used to change the direction of the laser output from a direction generally parallel to the TO header to another direction generally perpendicular to the TO header. In other embodiments, any other suitable mirror may be used instead of a silicon mirror. FIG. 3 also illustrates a line 210 that is normal to the surface of the mirror 206.

The mirror 206 receives the laser output and reflects it toward an optical fiber 208. The optical fiber 208 may be an end portion of a fiber optic cable or it may be a fiber stub enclosed at least partially in a receptacle. The fiber optical cable or the fiber stub for example may be SMF-28 or any other suitable single mode optical fiber.

In order to reduce the optical return loss in a TO packaged laser, the optical fiber 208 is slanted at the receiving end at a fiber cleavage angle θ with respect to a line that is perpendicular to a line substantially aligned with (or substantially overlapping) the optical fiber core, i.e., the core aligned line 214. This way, the optical output reflected by the surface of the optical fiber may be directed away from the mirror and therefore the laser. Such slanted end may be realized through cleaving and/or polishing. Since it is substantially aligned with the optical fiber core, the line 214 may be referred to as a core aligned line 214. In other embodiments, the TOSA (e.g., for a DFB laser) may include an LD isolator between the mirror and the optical fiber so that the reflected light can be further reduced.

Since a chief ray incident angle α is the angle between the core aligned line 214 and a chief ray 220 outputted by the laser 204, the laser, the mirror, the ball lens and the optical fiber should have a spatial relationship with one another such that the chief ray forms an angle of α=3.786 degrees with respect to the core aligned line 214.

When the mirror 206 has a cut angle of ω=45 degrees, the substrate tilt angle is given by: δ=2(45)−3.786−90=−3.786 or the angle identical in magnitude and opposite in direction to the chief ray incident angle α. However, the introduction of this additional stamping or tilting of the TO header may result in a more complex manufacturing process.

Therefore, in the exemplary embodiment, the need for introducing the substrate tilt angle δ is eliminated by adjusting the cut angle ω of the mirror 206. When the substrate tilt angle δ is set to be 0 degrees and the cut angle ω is made variable, the cut angle ω=(93.786 degrees/2)=46.893 degrees. Considering manufacturing tolerance of ±1.0° for the fiber cleavage angle of θ=8 degrees, the chief ray incident angle α varies between α=3.304 degrees to 4.209 degrees, so that the mirror cut angle ranges from 46.652 degrees to 47.1045 degrees.

In the exemplary embodiment, the mirror cut angle is selected to be approximately 47.2 degrees to direct the chief ray of the laser output to the edge of the optical fiber 208. In the optical interface, the ball lens 202 is not necessarily tilted because the ball lens is spherical, and any tilting does not result in a change to its spatial orientation. The ball lens 202, for example, may be mounted on a TO lens holder (not shown).

The chief ray in the exemplary embodiment is substantially aligned with the optical axis 212 that goes through the center of the ball lens 202. A centerline 216 of the ball lens that traverses (i.e., passes through) the center of the lens and is parallel to the core aligned line 214, is offset from the core aligned line 214 by an offset distance 218. The system of FIG. 3 may have a magnification of approximately 1:3.5 to 1:4. The magnification may be same or different in other embodiments.

Figure 4:
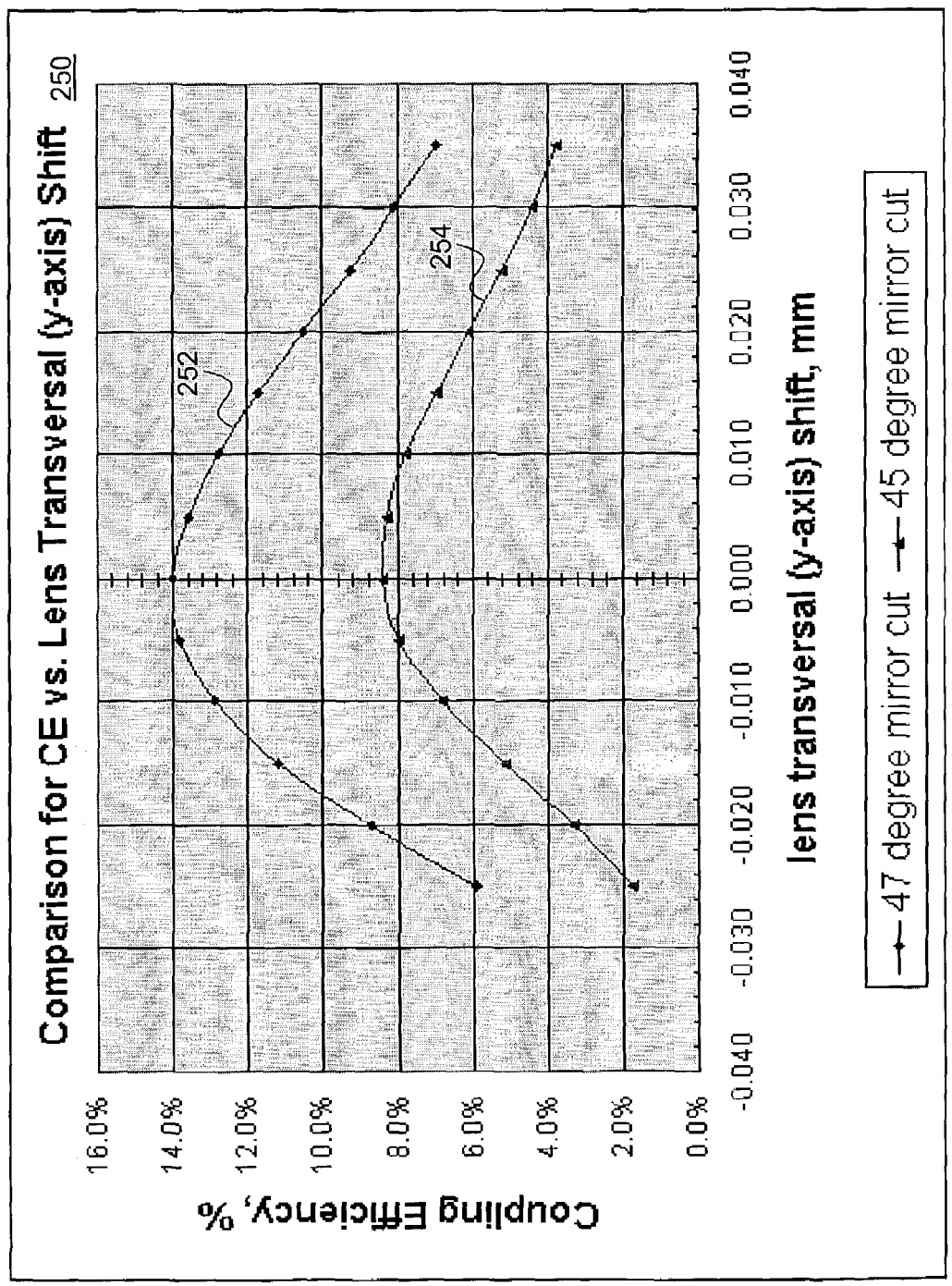
FIG. 4 is a graph that illustrates a comparison between coupling efficiency and a lens transversal shift in an exemplary embodiment in accordance with aspects of the present invention.

FIG. 4 is a graph 250 that illustrates a comparison between coupling efficiency and a lens transversal shift in an exemplary embodiment in accordance with aspects of the present invention. In FIG. 4, the graph 250 includes plots 252 and 254 that show an optical coupling efficiency vs. a ball lens transversal position shift along y-axis for mirror cut angle of 47 degrees and 45 degrees, respectively, in a vertical TO package-based TOSA. The fiber stub has a cleavage angle θ of 8 degrees, the substrate tilting of δ=0 degrees, and a ball lens has a diameter of 2 mm.

The plots 252 and 254 illustrate the different effects of on-axis aberration and off-axis aberration. For example, the lens transversal shift in the y-axis is zero when the chief ray of the laser output is substantially aligned with (i.e., substantially overlapping) the optical axis of the lens and the coupling efficiency is affected by the on-axis aberration. When the lens transversal shift in the y-axis is non-zero, the coupling efficiency is affected by the off-axis aberration. It can be seen in both the plots 252 and 254 that the coupling efficiency is maximized when the lens transversal shift in the y-axis is zero. When the lens is a ball lens, the magnification of the optical system may be adjusted through the z-axis shift of the ball lens.

Figure 5:
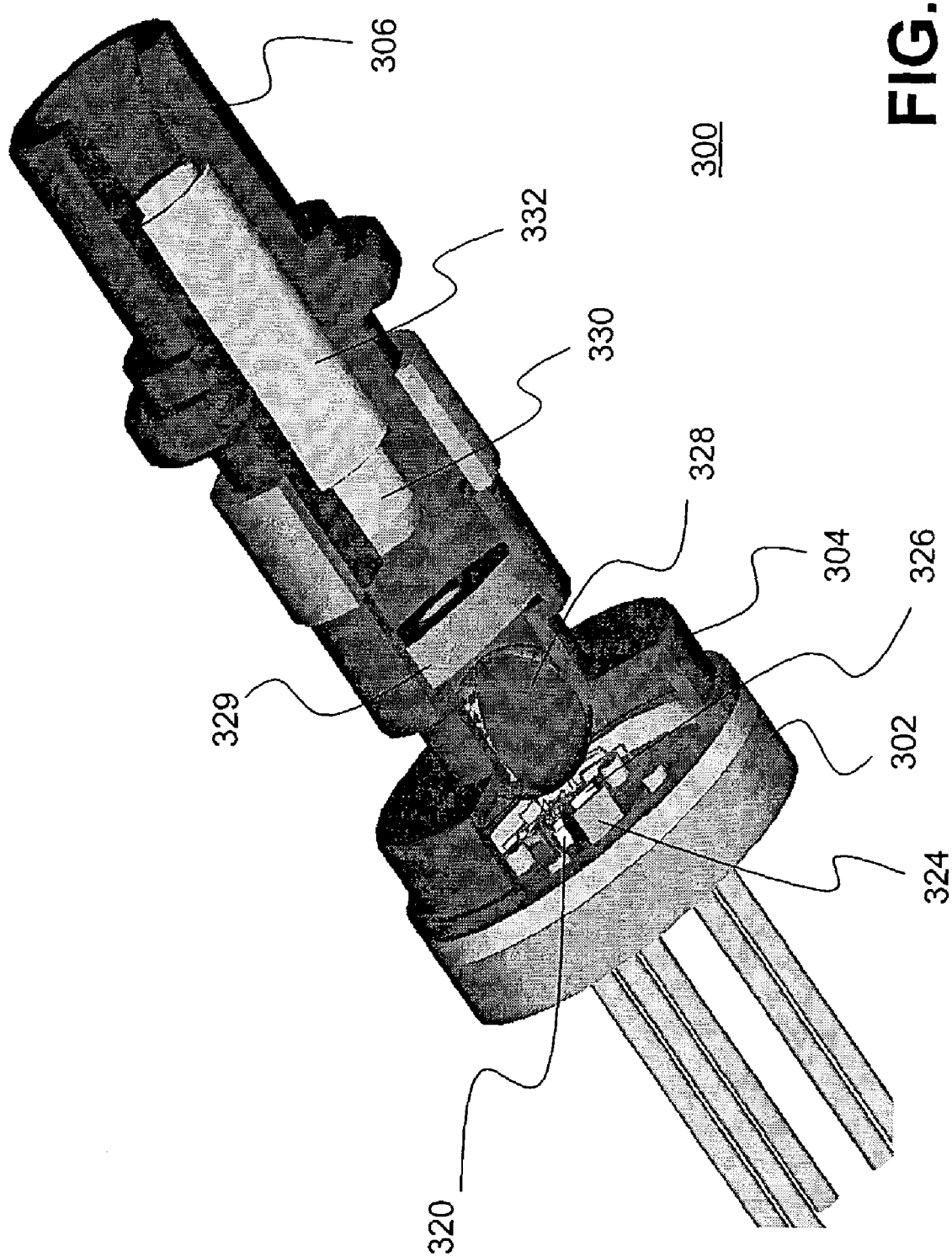
FIG. 5 is a view of a vertical configuration transmitter optical subassembly (TOSA), which may be used to implement an exemplary embodiment in accordance with aspects of the present invention.

FIG. 5 is a view of a vertical TO package-based transmitter optical subassembly (TOSA) 300, which may be used to implement an exemplary embodiment in accordance with aspects of the present invention.

The TOSA 300 is a vertical configuration TOSA that includes a TO header 302 with an opto-electronic assembly. The TO header 302, for example, may be a TO-56/46 header. The TO header 302 has mounted thereon a mirror 324, which may be a 47 degree silicon reflective mirror. The TO header 302 also has mounted thereon a laser diode 320 on a substrate. The laser diode 320 may be a DFB laser, a PF laser or any other suitable edge emitting or other laser.

Mounted on top of the mirror 324 is a monitoring photodiode (MPD) 326. In other embodiments, the MPD may be mounted at the back of the laser diode 320. The TO header 302 is connected to a lens holder 304 that holds a ball lens 328. The TOSA 300 also includes a fiber stub 330 and a fiber sleeve 332 that at least partially envelopes the fiber stub. The fiber sleeve 332 is held inside a receptacle 306, which may be of any suitable type, such as LC, SC, MU, FC or the like.

An LD (laser diode) isolator 329 is placed between the ball lens 328 and the fiber stub 330 to rotate the polarized beam (e.g., DFB laser output) by 45 degrees. The reflecting polarized beam from the fiber stub surface is rotated again by 45 degrees by the LD isolator 329 so that the reflected light can be further reduced, and the isolation may be greater than approximately 25 to 30 dB. In the exemplary embodiment, the LD isolator 329 includes a 0-degree polarizer, garnet material and a 45-degree polarizer. In other embodiments, LD isolators may include other components.

It will be appreciated by those of ordinary skill in the art that the invention can be embodied in other specific forms without departing from the spirit or essential character thereof. The present invention is therefore considered in all respects to be illustrative and not restrictive. The scope of the invention is indicated by the appended claims, and all changes that come within the meaning and range of equivalents thereof are intended to be embraced therein. For example, the optical interface in other embodiments may include two or more lenses. Further, the optical interface may also include two or more fold mirrors in the optical path to direct the optical beam to a desired location.

What is claimed is:

1. An optical interface between an optical fiber and a laser, said optical fiber having a core and an end, said optical interface comprising:
   a mirror capable of receiving an optical output of the laser and of reflecting the optical output to the end of the optical fiber such that a chief ray of the optical output is incident on the core of the optical fiber; and
   a lens located such that the chief ray of the optical output traverses a center of the lens in a direct line to the optical fiber,
   wherein the laser and the mirror are mounted substantially flat on a TO header, and wherein an angle of the mirror is used to reflect the chief ray toward the core of the optical fiber, and
   wherein the TO header is tilted with respect to the optical fiber to direct the chief ray to the core of the optical fiber.

2. The optical interface of claim 1, wherein said end of the optical fiber is slanted.

3. The optical interface of claim 1, wherein the lens comprises a ball lens.

4. The optical interface of claim 1, wherein the lens is oriented such that the chief ray is substantially overlapping an optical axis of the lens.

5. The optical interface of claim 1, further comprising a lens holder on which the lens is mounted.

6. The optical interface of claim 1, wherein the laser is an edge emitting laser.

7. The optical interface of claim 1, wherein an angle of a slanted end of the optical fiber is approximately 8 degrees and the angle of the mirror is approximately 47 degrees.

8. The optical interface of claim 1, wherein an angle of a slanted end of the optical fiber is approximately −8 degrees and the angle of the mirror is approximately 43 degrees.

9. The optical interface of claim 1, wherein the laser and the mirror are mounted at a tilt angle on a TO header, and wherein the tilt angle is used to direct the chief ray to the core of the optical fiber.

10. The optical interface of claim 9, wherein an angle of the mirror is approximately 45 degrees.

11. The optical interface of claim 9, wherein an angle of the mirror is approximately 54.7 degrees.

12. The optical interface of claim 1, further comprising an LD isolator disposed between the lens and said optical fiber.

13. An optical assembly comprising:
   an optical fiber having a core and an end;
   a laser;
   a mirror capable of receiving an optical output of the laser and of reflecting the optical output to the end of the optical fiber such that a chief ray of the optical output is incident on the core of the optical fiber;
   a lens disposed between the mirror and the optical fiber, the lens being located such that the chief ray of the optical output traverses a center of the lens in a direct line of the optical fiber; and
   a TO header,
   wherein the laser and the mirror are mounted substantially flat on the TO header, and wherein an angle of the mirror is used to reflect the chief ray toward the core of the optical fiber, and
   wherein the TO header is tilted with respect to the optical fiber to direct the chief ray to the core of the optical fiber.

14. The optical assembly of claim 13, wherein said end of the optical fiber is slanted.

15. The optical assembly of claim 13, wherein the lens comprises a ball lens.

16. The optical assembly of claim 13, wherein the lens is oriented such that the chief ray is substantially overlapping an optical axis of the lens.

17. The optical assembly of claim 13, further comprising a lens holder on which the lens is mounted.

18. The optical assembly of claim 13, wherein the laser is a DFB (distributed feedback) laser or an FP (Fabrey- Perot) laser.

19. The optical assembly of claim 13, further comprising a TO header, wherein the laser and the mirror are mounted at a tilt angle on the TO header, and wherein the tilt angle is used to direct the chief ray to the core off the optical fiber.

20. The optical assembly of claim 13, further comprising an LD isolator disposed between the lens and said optical fiber.

* * * * *